(12) United States Patent
Pelc et al.

(10) Patent No.: US 8,806,829 B2
(45) Date of Patent: Aug. 19, 2014

(54) ANCHORING DEVICE

(71) Applicants: Robert J. Pelc, Bradenton, FL (US); James Dean Upchurch, Parrish, FL (US)

(72) Inventors: Robert J. Pelc, Bradenton, FL (US); James Dean Upchurch, Parrish, FL (US)

(73) Assignee: The Ipé Clip Fastener Company, LLC, Bradenton, FL (US)

( * ) Notice: Subject to any disclaimer, the term of this patent is extended or adjusted under 35 U.S.C. 154(b) by 0 days.

(21) Appl. No.: 13/899,203

(22) Filed: May 21, 2013

(65) Prior Publication Data

US 2013/0247504 A1   Sep. 26, 2013

Related U.S. Application Data

(63) Continuation-in-part of application No. 13/090,808, filed on Apr. 20, 2011, now Pat. No. 8,464,488, which is a continuation-in-part of application No. 10/956,873, filed on Oct. 1, 2004, now abandoned.

(51) Int. Cl.
*E04B 2/00* (2006.01)
*E04F 15/02* (2006.01)
*E04F 15/04* (2006.01)
*F16B 43/00* (2006.01)

(52) U.S. Cl.
CPC .............. *E04F 15/02* (2013.01); *E04F 2201/05* (2013.01); *E04F 15/04* (2013.01); *F16B 43/00* (2013.01); *Y10S 411/902* (2013.01)
USPC ....... 52/585.1; 52/586.1; 411/902; 403/408.1

(58) Field of Classification Search
CPC .............................. E04F 15/02044; E04B 1/38
USPC ....................... 411/999, 902; 403/408.1, 291; 52/586.1, 585.1
See application file for complete search history.

(56) References Cited

U.S. PATENT DOCUMENTS

| | | | | |
|---|---|---|---|---|
| 876,399 | A  * | 1/1908 | Robinson | 52/714 |
| 5,997,209 | A  * | 12/1999 | Sachs | 403/388 |
| 6,318,927 | B1 * | 11/2001 | Schafer et al. | 403/408.1 |
| 6,540,432 | B2 * | 4/2003 | Albanese | 403/388 |
| 6,871,467 | B2 * | 3/2005 | Hafner | 52/586.1 |
| 7,140,156 | B1 * | 11/2006 | Lowe et al. | 52/263 |
| 7,398,623 | B2 * | 7/2008 | Martel et al. | 52/489.2 |
| 7,841,818 | B2 * | 11/2010 | Attanasio | 411/353 |
| 2003/0110727 | A1 * | 6/2003 | Gregori | 52/489.1 |
| 2003/0121226 | A1 * | 7/2003 | Bolduc | 52/391 |
| 2006/0107612 | A1 * | 5/2006 | Pelc | 52/698 |
| 2013/0247504 | A1 * | 9/2013 | Pelc et al. | 52/704 |

* cited by examiner

*Primary Examiner* — Andrew J Triggs
(74) *Attorney, Agent, or Firm* — Patricia M. Costanzo

(57) ABSTRACT

An anchoring device of highly resilient material of varying thicknesses, to accommodate the irregularly cut slots into which the anchors fit, is additionally embedded with one or more layers of high-strength material of solid or particulate form. The high-strength material, metal, for example, is notched to accommodate buckling, extension, and compression of planks secured by the anchor and has folds for increased strength. Multiple attachment apertures through the anchor allow use of a single anchor to secure two adjacent planks. The anchor is designed to keep planks separated from joists so that water can evaporate and not cause rot and to keep attached planks evenly spaced. The high-strength material is embedded into the anchor during the manufacturing molding process. Small openings within a layer of high-strength material provide for molten plastic of the molding process to reach all high-strength material surfaces creating a strong bond between plastic and high-strength material.

19 Claims, 15 Drawing Sheets

ANCHORING DEVICE

CROSS-REFERENCE TO RELATED APPLICATIONS

This is a Continuation-in-Part Application of U.S. patent application Ser. No. 13/090,808 filed Apr. 20, 2011, now allowed, which is a Continuation-in-Part of U.S. patent application Ser. No. 10/956,873 filed Oct. 1, 2004, now abandoned.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates to an anchoring device for retaining adjacent boards in precision spaced alignment, being particularly suitable for use with outdoor platform deck construction.

The background information discussed below is presented to better illustrate the novelty and usefulness of the present invention. This background information is not admitted prior art.

Outdoor spaced board platforms, generally referred to as decks, have become popular additions to homes, offices, restaurants, and the like. They generally comprise a plurality of elongate, flat laid, closely spaced boards, connected to and supported on their bottom surfaces by framing using spaced joists, stringers, beams, and the like to form a secure floor. Until recently, the boards were generally cut from natural wood, but they have been increasing manufactured from various compositions of wood and/or other cellulosic materials with various resins, and even plastics and various metals. The top surface of the boards is generally referred to as the face side of the board and the facing elongate sides of adjacent flat laid boards is generally referred to as the edges of the board.

To allow for drainage of water on the decking floor, the flat laid boards are kept spaced from one another. From an aesthetic standpoint the spacing between the boards should be maintained at a consistent distance. And from a safety standpoint, the distance between adjacent floor boards should generally be minimized for safe walking and standing, especially for those wearing high heels or those walking with bare feet. At the same time, the minimum distance must not only provide for water drainage from the floor, but also for expansion, contraction swelling, or the like, of the boards without engagement of adjacent boards.

It is also generally a desirable ornamental design to attach the flat laid floor boards to framing and/or stringers unobtrusively, without visible nail or screw heads showing on the face surface of the boards, and to provide an anchoring means that resists the warping of adjacent boards, particularly warping that is a continuous problem between connection points to joists, stringers and the like.

Various fastening devices have been proposed in an attempt to provide desirable ornamental design characteristics to flat laid boards yet each have serious shortcomings which mitigate against their use.

SUMMARY

Applicant herein introduces a set of inventive principles to provide for an anchor device possessing an exceptionally high degree of strength, cohesiveness, and supple resiliency, remains out of sight once installed, accommodates and corrects for uneven spacing of the slot that is precut into the sides of the boards into which anchor devices are inserted, and prevents the undersides of the deck boards from water rot due to water that drains off of the deck floor onto the joists. The strength of the device provides for a long-lived device, as the structural integrity of the device is not compromised by weather related stresses, such as rapid and even extreme changes of temperatures or by long periods of freezing. Neither does the device suffer from the pressures and stresses of weather changes and regular use of the floor that was created by flooring boards attached to supporting joists using the anchor device. It is expected that decking boards will expand, contract, and shift as a result of environmental changes, such as freeze and thaw, or dry and wet cycles, but the combination of its exceptional high-strength and a high degree of resiliency keeps the device in functioning condition, regardless of the stresses it may suffer. Additionally, because the anchor has a strength component that is as strong, or much stronger, than the decking boards, once in position, the anchors help to prevent the boards from warping. The high strength of the anchor also protects the device from damage that is often caused by over-tightening of the screws or nails used to attach the anchors to the joists. In fact, because this type of damage is so prevalent, to avoid damage from over-tightening using known anchors, many installers deliberately fasten the screw or nail loosely which can lead to a failed attachment. Using the anchor made according to the principles of the present invention, installers no longer need to deliberately loosely fasten a screw or nail means. Thus, the strength of the device protects the device against such pressures and stresses, while the resiliency of the device serves in part to protect the boards from being offset or damaged as they expand and contract. Accordingly, Applicant's inventive principle requires anchor devices to be constructed from both a combination of resilient plastic and a high strength material. There are several methods that may be used to embed the high strength material within the resilient plastic device to provide a functioning combination of high strength and resiliency to provide an anchor that can securely and sustainably attach decking floor boards to supporting joists while assuring that a desired spaced relationship is maintained between the boards. The various methods of making anchor devices according to the present inventive principles will be discussed below and in the Detailed Description Section.

A high-strength metal reinforced resilient plastic anchor for joining adjacent flat laid boards that provides both malleability and strength is one example of the claimed device. This anchor device comprises a generally horizontal, resilient plastic top element which is the metal reinforced part and extending downwardly from the underside thereof is a generally downward extending guide element. In this example, a high-strength material in the form of a metal plate is introduced into the resilient plastic as the anchor device is molded, although alternatively, the plastic anchor device may be molded with a slit in it and a metal, or other high-strength material, plate may be inserted into the slit once the anchor device is molded. The top element has a fastening opening therein which passes through the metal reinforcing plate and is arranged to accept a screw or nail means for fastening the anchoring device to a joist or adjacent flat laid board. The top element of this example of an anchor device of the inventive concept of the present invention is in the form of a generally flat plate of measured thickness generally corresponding to about the width of a joining slot in the edge of a flat laid board in which it is to be inserted. The generally flat plate can be described as a thick plate consisting of two halves or flanges. To use this anchor device, a first board is laid over, and if desired, attached to a supporting joist. Such decking boards are generally supplied with precut side-spaced biscuit-joiner slot that is at a specific distance from the top and bottom surface. A flange of one of the devices is inserted into the precut slot and a screw or nail may then be inserted into the fastening aperture provided therethrough for fastening the board, via the device, to the supporting joist. The other flange of the device, that is the side of the top element that is protruding from the slot of the first laid board, is then inserted into the accepting slot of a second board as the second board is placed into position on the supporting joist next to, but spaced from, the first board. The anchor assures that a specific gap will be maintained between the boards to allow for drainage and to provide differential movement space when, for example, the boards swell from heat and moisture. The device, as is readily apparent, is not a screw or a nail, but it can accept a nail or screw into an accepting aperture that is provided. To provide for the secure spaced attachment of the decking boards to the joists the device must have strength, such as the strength of steel. The device must also be strong enough to maintain the screw or nail that is positioned through the accepting aperture in its desired position without the screw or nail damaging the device as various stresses are placed on the floor boards, and thus on the device, during regular use. Thus, the thickness of the high-strength material, and the fastener opening therethrough, are sized to provide a maximum amount of resistance to the passage of the head of a screw or nail fastening means therethrough. To provide for expansion and contraction of the floor boards after they have been securely attached to the supporting joists, the device is manufactured with plastic having the required properties of flexibility and resiliency.

In another embodiment, the top surface of the top element has a generally flat peripheral area with a central area sloping downwardly toward a central opening. In a still further embodiment, the top side of the top element comprises an upwardly extending shoulder arranged to extend over the fastening opening and conceal the opening from direct overhead view. The side of the shoulder comprises an opening sized and aligned to enable passage of a screw or nail through the opening of the horizontal element for attaching the device to a joist or flat laid board. The shoulder may be dimensioned to any suitable width, but it is generally desirable to be of the same or less width than the width of the downward extending element. In an embodiment where in the shoulder width is the same as the width of the downward extending element, it is generally desirable that the shoulder comprise a hollow and that the walls of the hollow are dimensioned in thickness to be collapsible.

When viewed from a top plan view, the horizontal top element can be generally circular, oblong, elliptical, polygonal or the like, and can be of any convenient thickness. Generally, it is preferred that a metal plate sandwiched therein be of a similar shape. Thus, in preferred embodiments a generally circular horizontal element preferably comprises a generally circular metallic plate; a generally oblong element comprises a generally oblong plate and polygonal element a generally polygonal plate. Generally it is preferred that plastic fully surround the metal plate, that is the metal plate should be embedded in the plastic so that the metal plate is surrounded by plastic on its top, bottom, and peripheral edge, but such is not required. In one embodiment, a metal plate rests in a conforming seat of plastic around its peripheral edge and bottom surface. In another, only a portion of the top surface of a metal plate is covered.

The elongate downward extending element is formed in continuum with plastic comprising the horizontal top element and serves several functions. The downward extending element serves as a attachment guide for assuring the top element is fixed at about a right angle to the edge of the flat laid board it is fastened to, while its depth provides a measured distance between the edges of adjoining boards for consistent ornamental design, as well as to provide for any needed drainage and for expansion of the boards. The downward extending element also serves to as a nail or screw cover, keeping whatever attachment means is used separate from the boards. A high-strength material may also be added to the downward extending element while it is being manufactured.

In one embodiment the downward extending element is a collapsible element comprising a hollow and the walls forming the hollow of the downward extending element are sized in thickness and strength to collapse and/or break upon excessive compression of the element through swelling of adjacent flat laid boards. In such embodiments, wherein the plastic is flexible, the downward extending element collapses. In such embodiment wherein the plastic is stronger the downward extending element is formed thin walled to enable it to break under the force of swelling adjacent boards. In other embodiments, used particularly with rigid plastics, the end of a generally hollow downward extending element at the underside of the top element is dimensioned thinner to shear under a measured force.

In a preferred embodiment, the hollow of the downward extending collapsible element has an opening at its end distal from the horizontal element. In a further preferred embodiment, the end of the downward extending collapsible element, nearest the horizontal top element, further comprises one or more outlet openings along one or more of its engaging surfaces in alignment with the fastening opening of the top element, so that a fastening screw or nail means can be angularly directed through the fastening opening of the top element through a side of the collapsible element.

One or more generally downward extending elements of any suitable curved or polygonal shape extends downwardly from the underside of generally horizontal top element. In one embodiment, the downward extending collapsible element is a hollow polygonal box comprising an opening at its distal end. In a further embodiment, the downward extending collapsible element comprises adjacent hollow rectilinear boxes arranged on opposite sides of a central opening along a common centerline with an opening at their distal ends. Downwardly extending collapsible element(s) are generally of cylindrical, elliptical, oblong, spheroidal, or the like cross-section, with an open distal end. Downward extending spheroidal elements, especially those to which a high-strength material has been added have that extra width and strength that is needed to contribute to the anchor's ability to keep the boards spaced at the desired distance and direction. There may be times when the diameter of the spheroidal element would be too large for the desired spacing but reducing the diameter of the spheroidal element would decrease its height and that would reduce the height of the top element that is supported by the spheroidal element, thus, when the diameter of the spheroidal element must be reduced a support leg is positioned beneath the spheroidal element to increase the height of the top element.

In a still further embodiment of the invention, the downward extending element comprises a tab arrangement which is displaced when subjected to force occasioned by swelling and the like of adjacent flat laid boards. An assembly tab(s), connected to the underside of the top element and/or to the downward extending element, is spaced from the downward extending element, and has an installation surface facing opposite from an edge mounting surface of the downward extending element. The assembly tab(s) is arranged to displace from position when subjected to the excessive pressure of swelling, but to resist displacement during deck assembly. In a preferred embodiment, the downward extending element is arranged offset from a centerline of the generally horizontal member and is dimensioned to a thickness less than the desired assembly distance between laid boards. The surface of the downward extending element which is the most offset from the centerline of the horizontal element, comprises the edge mounting surface of the downward extending element, and is arranged so that the distance from the edge mounting surface of the downward extending element and the installation surface of one or more tabs comprises the desired ornamental assembly distance between laid boards. Thus, during installation the anchors are screw or nail fastened with the mounting surface of the downward extending members engaging the first laid board and the second laid board is inserted into position with its adjacent edge engaging the installation surface of the tabs. Upon swelling of the boards, the assembly tabs are displaced by breaking off or bending in response to the decreasing distance between flat laid boards.

The opening in the horizontal top element is provided to enable screwing, nailing or the like the anchor device to a joist or an adjacent flat laid floor board. An opening can be of any suitable shape. In one embodiment the opening is generally circular. In a further embodiment the opening is oblong. In a still further embodiment the opening is polygonal. In one embodiment the opening is generally central to the top element. In a further embodiment the opening is generally offset from the center of the top element.

In other examples, discussed in more detail below, the high-strength material added to the resilient plastic is a particulate form of metal, such as chips, shavings, or the like. In yet other examples, the high-strength material is other than metal, such as rigid plastics and fiber glass, for example. In these examples, the rigid plastic or fiber glass can be in plate form or in particulate form. The small particles of high-strength material can be either uniformly dispersed or positioned within the plastic, such as during the plastic's molding process, as the final use dictates. The use of particulates is especially important when the usefulness of the anchor device can be substantially enhanced by manufacturing the device so that its high-strength sections are discreetly positioned to be exactly where required. For example, if the edge of a circular plate of an anchor is required to be resilient while its central area requires strength, the particles of high-strength material can be concentrated in the central area. Similar function or design needs can be met using solid metal, fiber-glass, or the like, by either shaping the solid or customizing its thickness or both.

In still another embodiment, the surfaces of the top element provide increased friction or resistance between the top, bottom, and/or side surfaces of the anchor and the surfaces of the slot to further assure that the anchors remain firmly in place. Known anchors are known to move under stress, which among other deleterious effects, cause the spacing between the boards to change, presenting an unattractive positioning of the boards. The inventive concept, as taught herein, offers several ways to increase the friction or grabbing power of the top element of the anchor. Greater friction or resistive properties can be produced in the top and/or bottom surfaces of the top element by changing the shape of the surface. For example, the otherwise planar top or bottom surface can be molded to be convex or concave producing areas of greater and lesser thicknesses of the body of the top element. Having an anchor made of a resilient plastic with areas of greater and lesser thicknesses makes this anchor work in many instances where more rigid anchors (made of any other rigid material, such as rigid plastic or metal) are prone to failure. For example, when the material of the deck boards contracts, the slot spaces can increase, and the resilient areas of greater thickness will expand to fill the increased space. Alternatively, when the decking is grooved into "wet" boards and dries during the time it takes to be milled, stored, and delivered to a jobsite the slot space can shrink. Because the areas of greater and lesser thicknesses are made according to the principles of the invention, which require a resilient material, the greater thickness areas will easily compress to fit into such narrow slots. One embodiment has a slight raised ridge along the outer side of the top element to make sure the hold-down force of the device is as deep in the groove as possible to help keep the boards from cupping as no slot is machined perfectly flat. In any of the cases where the slot size increases, the anchor areas of greater thickness will remain in contact with the surfaces of the slot to create a resistance between the board and the anchor to keep both the board and the anchor in place and will do so without damaging the boards. The resilient plastic will not, cannot, cut into, or in any other way, damage the deck board. Known anchors made of metal, that by the property of metal means the anchors are rigid, are not able to accommodate any slot that was cut on a short tolerance, and instead of creating an increased friction surface will damage the surfaces of the slot. Another attribute of the resilient plastic is that when pressure is applied to the edge of the deck boards, such as when they are stepped on, the areas of greater thickness can supply the support that was removed when the slot was incised into the board and, again because it is a softer material does so while preventing the wood above the slot from cracking. While the resilient top element of the claimed invention is can be inserted into a slot with ease, known anchors of metal or rigid plastic must be pounded into "tight" slots or discarded. When installers try to force such rigid devices into a slot, the wood becomes stressed and can split.

Another way the present invention provides for surfaces with greater frictional or resistance properties is to provide the surfaces with protuberances extending out from the surface. The protuberances take different forms, as they can be spike, squared, or rounded shaped for example. It is to be understood that the protuberances may be found on any of surfaces of the top element, which includes the top, bottom, and side surfaces. Where the protuberances are to be located is decided by the requirements of each job. Because the protuberances are made of resilient plastic, they will not cut into, or in any other way, damage the deck board. There are anchors made of metal that could have metal ridges, but metal ridges are sharp and extremely rigid and, thus, could not be accommodated by any slot that was cut on a short tolerance, and instead of creating an increased friction surface contact between the surfaces of the slots and the anchor, anchors with such hard, rigid sharp protuberances could cut into the board and create weak spots. Another attribute of protuberances of resilient plastic is that when pressure is applied to the edge of the deck boards, such as when they are stepped on, the protuberances of the anchor supply the support that was removed when the slot was incised into the board and also help to prevent the wood above the slot from cracking. The only protuberances that can work in all of these cases are protuberances that are made of a resilient plastic because they will compress when stressed and they will retain their original shape when the stress is removed.

Additionally, there is a high-strength metal reinforced resilient plastic anchor for joining adjacent flat laid boards that provides both malleability and exceptional strength comprises a generally horizontal, resilient plastic top element reinforced by a plurality of metal reinforced core components with each component being of a convex or concave shape, having surface bends or ridges, having apertures therethrough, or any combination of these. Extending downwardly from the underside of the top element is a generally downward extending guide element. In this example, the increased strength core material is introduced into the resilient plastic top element as the anchor device is molded, although alternatively, the plastic anchor device may be molded with a slit in it and the core component(s) may be inserted into the slit once the anchor device is molded. The top element has at least one fastening opening therein which passes through the core reinforcement and is arranged to accept one or more screw(s) or nail(s) or some analogous means for fastening the anchoring device to a joist or adjacent flat laid board. Having two or more fastening apertures through the core reinforcement provides for case when the anchor is positioned over the area where two boards are abutting and the fastener, such as a screw, could not fully penetrate either board. Having the ability to set two screws, or other fastener, means that there is a fastener in each board and the connection between board(s) is secure. Of course, instead of two or more apertures in the core reinforcement, there may be only one, but that one is shaped to accept two, or more, fasteners. The top element of this example of an anchor device of the inventive concept of the present invention is in the form of a generally flat plate of measured thickness generally corresponding to about the width of a joining slot in the edge of a flat laid board in which it is to be inserted. The thickness of the exceptionally high-strength core material, and the fastener opening therethrough, are sized to provide a maximum amount of resistance to the passage of the head of a screw or nail fastening means therethrough. To provide for expansion and contraction of the floor boards after they have been securely attached to the supporting joists, the device is manufactured with plastic having the required properties of flexibility and resiliency. Moreover, to provide for expansion and contraction of the floor boards, the core reinforcement is provided with a notch, or other opening, to complement the expansion and contraction ability of the plastic of the anchor. Accordingly, there is provided an anchoring device being an anchor that anchors adjacent planks to each other and to a support or joist, that comprises: a generally horizontal top element of varying thicknesses; a generally horizontal bottom element, the bottom element maintaining a separation between the planks and the support, and a connector connecting a top element to the bottom element, the top element, the bottom element, and the connector made of a resilient material, the top element having a core component of a non-resilient, hard but not brittle material, the top element sized for insertion into a joining slot of a laid plank (150), and the top element and the bottom element having one or more fastening apertures therethrough.

For a fuller understanding of the device of the present invention, reference should be made to the following detailed description taken in connection with the accompanying drawings. Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which:

FIG. 13A is a perspective view of the anchoring device, as shown in FIG. 13, with the device unfolded and not in use.

REFERENCE CHARACTERS AND PARTS TO WHICH THEY REFER

Figure 1:
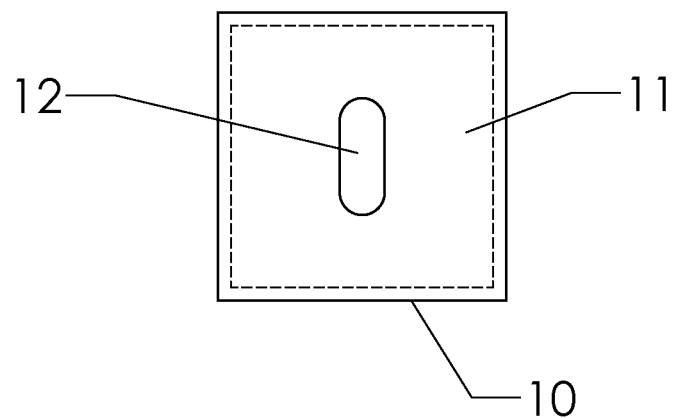
FIG. 1 is a top plan view of an anchoring device of the invention showing the geometric shape of the embedded high-strength material by the dotted line.

10 Top element.
11 Embedded high-strength material.
12 Fastening aperture.
20 Top element.
21 High-strength core material.
22 Fastening aperture.
23 Ridge.
23a Ridge.
30 Top element.
31 High-strength core material.
32 Fastening aperture.
32a Fastening aperture.
33 Shoulder extending upward.
34 Downward extending element extending downward.
40 Top element.
41 High-strength core material.
42 Fastening aperture.
43 Fastening aperture.
44 Hollow cylindrical rectilinear element
45 Fastener.
50 Top element.
51 High-strength core material.
52 Fastening aperture.
60 Top element.
61 High-strength core material.
62 Fastening aperture.
63 Shoulder.
64 Hollow downward extending rectilinear element.
65 Hollow downward extending rectilinear element.
70 Top element.
70a Underside of top element.
71 High-strength core material.
72 Fastening aperture.
74 Solid rectilinear element.
75 Solid rectilinear element.
76 Assembly tab.
76a Shear line.
77 Assembly tab.
77a Shear line.
80 Anchor assembly.
81 Top element.
82 High-strength core material.
83 Protuberance(s).
84 Downward extending element extending downward.
85 Lower surface of top element.
85a Top surface of element 80 depressed inwardly.
85b Bottom surface of element 80 depressed inwardly.
90 Anchor assembly.
91 Fastening aperture.
92 High-strength material.
94 Spheroidal element extending downward from and supporting top element 91.
95 Top element.
98 Base support for spheroidal element.
100 Anchoring device: self-adjusting, groove tolerance compensating, edge-mount deck-plank to joist fastener to alleviate moisture rot.
101 Screw.
102 Groove height tolerance compensator strap connecting 104 to 118.
104 Deck board-joist separator, also referred to as bottom element.
106 Openings for drainage and screw clearance.
108 Alignment tab.
112 Shoulder of deck board-joist separator 104.
113 Joist.
114 Spacers for keeping laid planks at desired distances from each other.
116 Attachment apertures.
118 Edge-mount fastener, also referred to as top element.
150 Plank.
152 Joining slot or groove in plank.
160 High-strength core material.
162a High-strength core material unit having concave shape.
162b High-strength core material unit having convex shape.
164 High-strength core material unit with expanded expansion bend.
166 High-strength core material unit with compressed expansion bend.
168 High-strength core material unit with strengthening bends.
170 High-strength core material unit with multiple differently shaped strengthening bends.
172 High-strength core material unit having an aperture 174 for connection to joist, and apertures 176.
174 Aperture for attaching anchor to joist.
176 Apertures to ensure complete contact between molten plastic and high-strength core material embedded within.

DEFINITIONS

Anchor, as used herein, refers to a fastening device that is used to attach flat laid floor boards or planks to framing, stringers, or joists without visible nail or screw heads showing on the face surface of the boards. Anchors may be referred to as fasteners or deck clips.

Board, as used herein, refers generally to a long flat board often of wood but as used herein boards made of materials other than wood; sometimes referred to as a plank.

Fastener, as used herein, refers to a fastening device that is used to attach flat laid floor boards or planks to framing, stringers, or joists without visible nail or screw heads showing on the face surface of the boards. Fasteners may be referred to as anchors or deck clips.

High-strength material, as used herein, refers to any material, in solid or particulate form, that provides the strength that is required for the anchor, in which the high-strength material is imbedded, to withstand the pressures of the decking boards or planks that the anchors fastened to a support, and to protect the anchor from damage from the additional pressure and stresses on it due to the expansion and contraction of the planks as a result of environmental changes, such as cycles of hot/cold and warm/dry. Typical high-strength materials are hard, not brittle, have a high tensile strength, such materials can include metals, alloys, plastics, and such.

Joist, as used herein, refers to any of the wood, steel, concrete, or other material beams set parallel from wall to wall or across or abutting girders to support a surface, such as a floor or ceiling, for example.

Plank, as used herein, refers to a long, flat piece of timber or other material; may be referred to as a board.

Protuberance, as used herein, refers to something, such as a bulge, knob, or swelling that protrudes from one or more surfaces under consideration, where the surfaces are the top, bottom, and side surfaces of the top element of the anchor of the present invention. According to the inventive concept the protuberances protrude from the surfaces of the top element only to the extent that the entire top element can be fit into the slot that is precut into the sides of decking or flooring boards for this purpose. Thus, the height of the protuberances is determined by the height of the slot and the resiliency of the protuberances.

Resilience is the physical property of material that allows the material to be repeatedly stretched or deformed at room temperature and to resume its shape after being so stretched or deformed (elasticity).

Support, as used herein, is an object designed to transfer or support a specific type of load. For example, a joist is a support for a floor board, and a relatively flat roof top is a support for a joist.

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms, examples of which are given below. Therefore, the embodiments described herein are provided with the understanding that the present disclosure is intended as illustrative and is not intended to limit the invention to the embodiments described herein.

The present invention is directed towards an anchoring means that provides both high-strength and great resiliency. The high-strength of the anchor gives it the ability to withstand pressure exerted upon it by the board(s) it is anchoring. Thus, the anchor will not split or bend when under pressure and in so doing helps to keep the boards from buckling and bending as temperatures and humidity vary. In particular, the high-strength of the anchor protects it from the defects that might otherwise be caused by the metal fasteners used to fasten the anchor to the board supports. The resiliency of the anchor provides the tolerance required to accommodate regular expansion and contraction of the planks caused by cycles of freeze/melt, wet/dry, and warm/cold. To achieve all of these advantages, the inventive concept is to have such an anchor manufactured from resilient plastic impregnated with a high-strength material. The high-strength material can be as a solid or in a particulate form as long as it can be positioned within the anchor to provide areas of high-strength next to areas of resiliency. Additionally, anchors made according to the inventive principles taught herein are able to compensate for the tolerances of the pre-cut slots in the decking boards by having a top element of varying thicknesses. These specialty formed surfaces may be uniformly thicker in some portions, such as being thicker about the periphery or they may be manufacture to be thicker in a patterned effect.

Although several variations will be described below, in general an anchor consists of a "top element" which may be described as having a first part and a second part, where each part is half of the top element. These parts will be referred to as flanges, as it is the flanges that will be inserted into the "biscuit" type slot that is pre-cut into the sides of decking boards. Extending from the bottom of the top element is an element with a hollow area, for example. In other styles there may be a downward extending element that is not hollow. An aperture for receiving a fastener for fastening the anchor to one of the supports supporting the deck flooring boards is to be positioned through the top and downward extending element. In other styles there may be a plurality of apertures for receiving fasteners. Within the elements, especially within the top element, there is embedded a high-strength material, such as a metal plate, metal particulate matter, or other rigid high-strength material that is either platy or particulate, such as fiber glass or high-strength rigid plastic for example. In other styles there may be embedded into the top a plurality of high-strength material plates. The top and/or bottom surfaces may exhibit varying degrees of thicknesses to compensate for low tolerance in the cut of the slot, to provide support for the thinned edges of the boards, and to prevent buckling and cracking of the boards, for example. The high-strength material component provides similar benefits in protecting the integrity of the anchor against, for example, over-tightening of the fastener by installers, or from the pressures and stresses of the boards as they react to changes in their environment.

Figure 2:
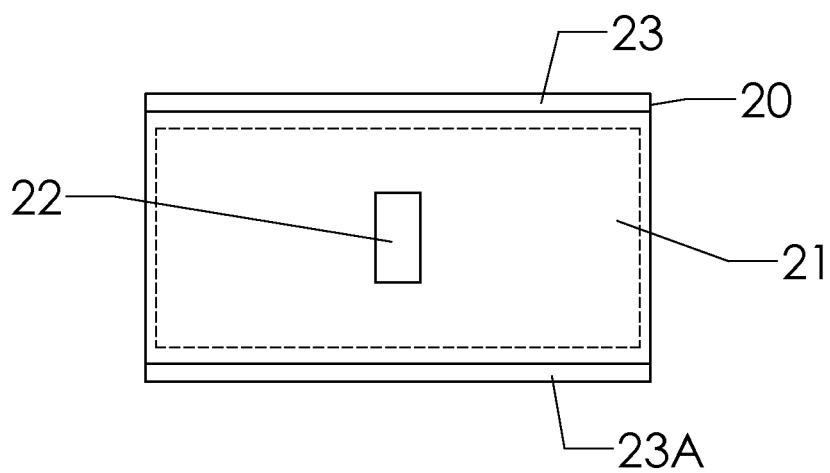
FIG. 2 is a top plan view of another anchoring device of the invention showing the geometric shape of the embedded high-strength material by the dotted line.
Figure 3:
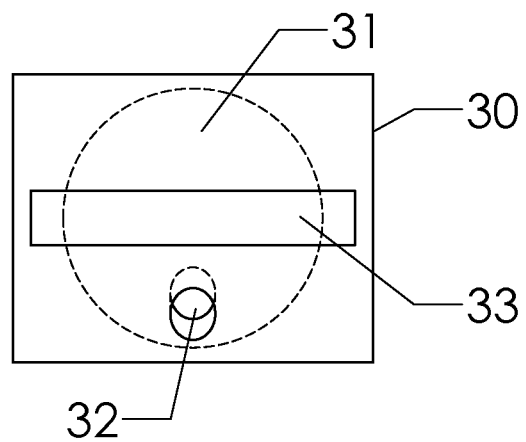
FIG. 3 is a top plan view of another anchoring device of the invention showing the geometric shape of the embedded high-strength material by the dotted line.
Figure 4:
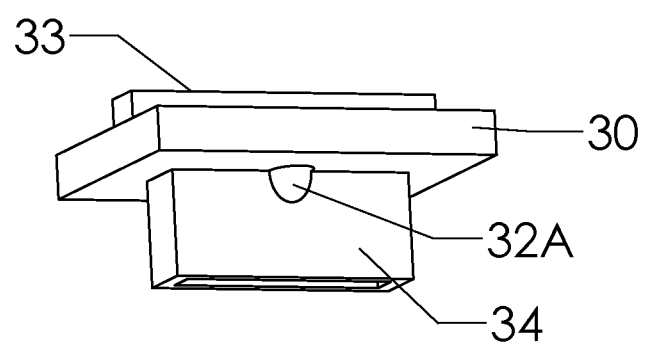
FIG. 4 is a perspective view of the anchoring device of FIG. 3.

Referring now to FIGS. 1-4, FIG. 1 illustrates a top plan view of one example of an embodiment of the anchoring device of the invention having a generally square top element 10, with embedded high-strength material 11 indicated by the dotted line. In this case embedded high-strength material 11 also is generally square. Embedded high-strength material 11 could be a plate of high-strength material, such as a metal plate or a plate of fiberglass or high-strength plastic, for example, or the embedded high-strength material 11 could be a particulate form of any high-strength material. This choice of materials holds true for all the examples given unless stated otherwise and, thus, will not be repeated for every example. Top element 10 has oblong fastening opening 12 therethrough, though it is to be understood that the fastening openings may be of any required shape. This example of the inventive principles is meant to have resilient plastic surrounding the sides and exterior peripheral edges of embedded high-strength material 11, with the embedded high-strength material at the generally central aperture not being covered by plastic. FIG. 2 illustrates a top plan view of an embodiment of the anchoring device of the invention having a generally rectangular top element 20 and embedded high-strength material 21 indicated by the dotted line as also being generally rectangular and having a rectangular fastening opening 22 therethrough. This embodiment also shows the top element comprising one or more ridges, 23 and 23a along its top, but that could be and/or on the underside, as well. In a still further embodiment example, as illustrated in FIGS. 3 and 4, the anchoring device comprises upwardly extending shoulder 33 arranged on the top side of top element 30, with embedded high-strength material 31 being generally circular as indicated by the dotted line, and a circular fastening aperture 32 extending from the top side of top element 30 to the bottom side (see 32a in FIG. 4). The upwardly extending shoulder may be dimensioned to any suitable width, but it's generally desirable to be of the same or less width than the width of hollow rectilinear downward extending element 34 which, as illustrated in FIG. 4, extends vertically downwardly from the bottom side of top element 34. When the shoulder width is the same as the width of the downward extending element, it is generally desirable that the shoulder be a hollow construction and that the walls of the hollow be of a thickness to be collapsible. This embodiment is generally desirable for use with flat laid boards and is particularly preferred for use with flat laid boards which undergo significant climactical dimensional changes. The offset placement of the fastening aperture allows the anchor to be fastened to the flat laid board to which it is related in a hidden manner, in that when the second board is pushed into position with regard to the earlier laid board and the anchor, the screw head is covered by being within the slot thereof.

Figure 5:
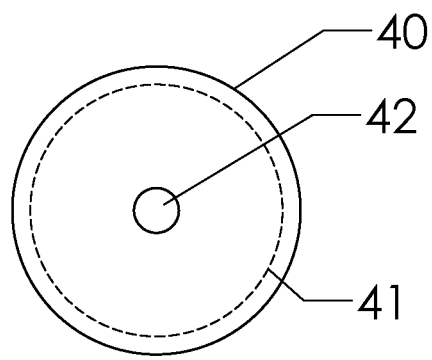
FIG. 5 is a top plan view of another anchoring device of the invention showing the geometric shape of the embedded high-strength material by the dotted line.
Figure 6:
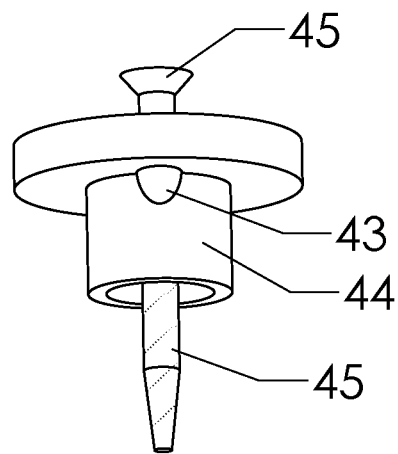
FIG. 6 is a perspective view of the anchoring device of FIG. 5 shown with attachment screw.

FIGS. 5 and 6, a top plan and bottom side perspective view, respectively, illustrate an example of the anchoring device, manufactured according to the inventive concepts as taught herein, having generally circular top element 40, with embedded high-strength material 41 being outlined in dotted line. Fastening aperture 42 is arranged about center of top element 40 and collapsible hollow cylindrical downward extending element 44 is illustrated as a cylindrical member extending downwardly from the underside thereof, with fastening screw 45 shown extending generally vertically there-through for direct attachment to a joist or the like. Alternate fastening opening outlet 43 is illustrated as extending through the side of downward extending element 44 for fastening to an adjoining flat laid board.

Figure 7:
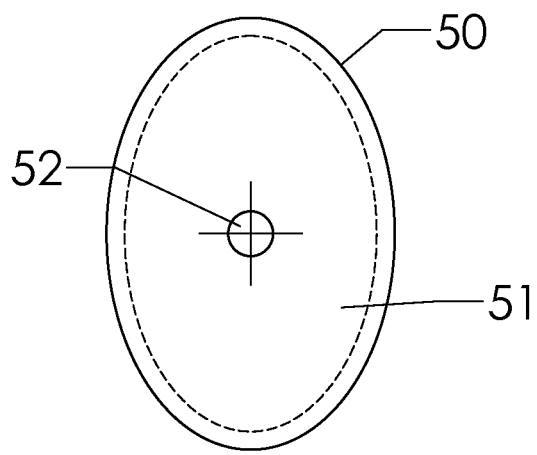
FIG. 7 is a top plan view of another anchoring device of the invention showing the geometric shape of the embedded high-strength material by the dotted line.

FIG. 7, a top plan view, illustrates an example of the anchoring device following the present inventive concept having generally oval top element 50, with embedded high-strength material 51 indicated by the dotted line, and having a generally circular fastening opening 52 there through. This embodiment is particularly preferred for use with flat laid boards in which spaced mating biscuit joiner slots are cut.

Figure 8:
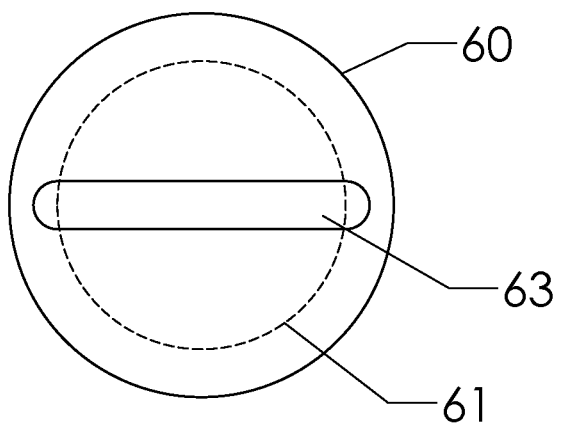
FIG. 8 is a top plan view of another anchoring device of the invention showing the geometric shape of the embedded high-strength material by the dotted line.
Figure 9:
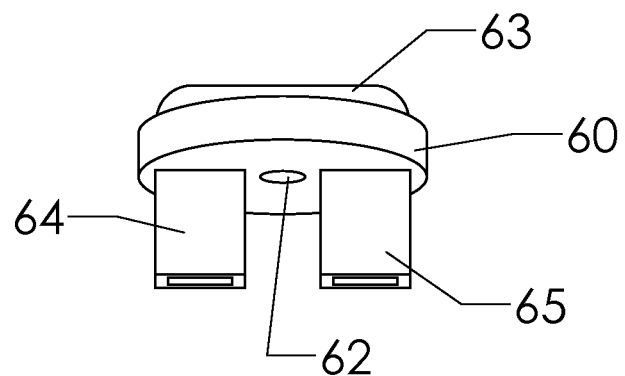
FIG. 9 is a perspective view of the anchoring device of FIG. 8.

FIGS. 8 and 9, top plan and bottom side perspective views, respectively illustrate an example anchoring device having generally circular top element 60, with embedded high-strength material 61 indicated by the dotted line. Fastening aperture 62 is arranged about center of the top element and the top element comprises shoulder 63 extending upwardly from the top side of top element 60 and collapsible hollow rectilinear downward extending elements 64 and 65 extending downwardly from the underside thereof. In this embodiment of the invention, shoulder 63 comprises an aperture (not shown) along its side at about its confluence with top element providing entrance to fastening opening 62. This side entrance to the attachment aperture hides a screw or nail head from direct top view, in a manner similar to that described above in relation to the example illustrated in FIGS. 4 and 5, and is a preferred embodiment for deck construction where visible screw heads are discouraged.

Figure 10:
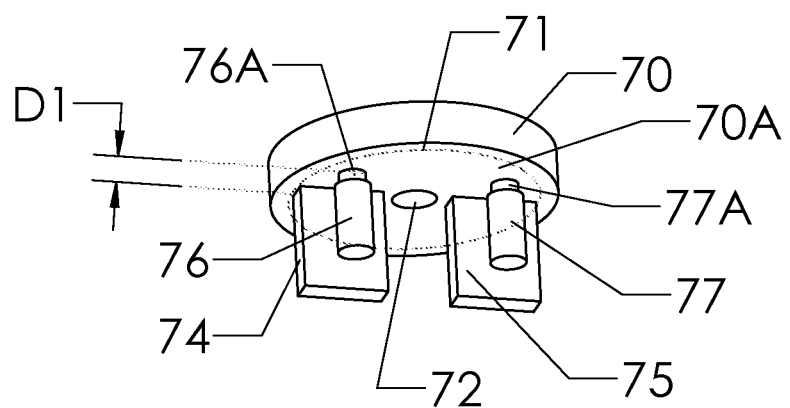
FIG. 10 is a perspective view of a further anchoring device of the invention.

FIG. 10 illustrates a bottom side perspective view of an embodiment of the anchoring device of the invention having a generally oblong top element 70, with embedded high-strength material 71 being outlined in dotted line. Fastening opening 72 is arranged about center of the top element and solid rectilinear downward extending elements 74 and 75 extend downwardly from the underside thereof, offset from about the centerline of top element 70. In this embodiment of the invention, assembly tabs 76 and 77 extend from the underside 70a of top element 70 and comprise reduced dimensioning shear lines 76a and 77a at their boundary with top element 70, enabled to break when subjected to a defined generally perpendicular force. Dimension d1 is sized to the desired ornamental assembly dimension between boards. It should be understood that though assembly tabs in this embodiment are illustrated as solid tabs breaking away under stress, they may be hollow tabs and the like and may be rigidly or flexibly connected to the downward extending element so as to be displaced by breaking away or bending to a different position under the force of swelling and the like generally horizontal stress.

Figure 11A:
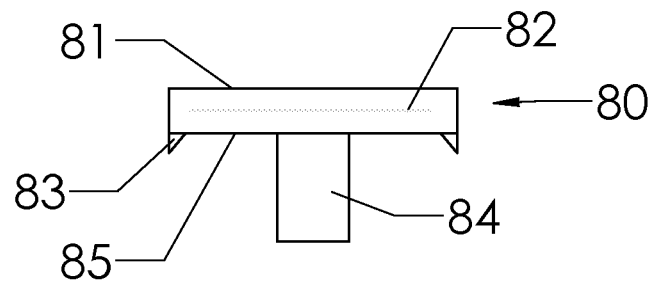
FIGS. 11A-11J are side elevation views of additional examples of anchoring devices according to the principles of the present invention.
Figure 11B:
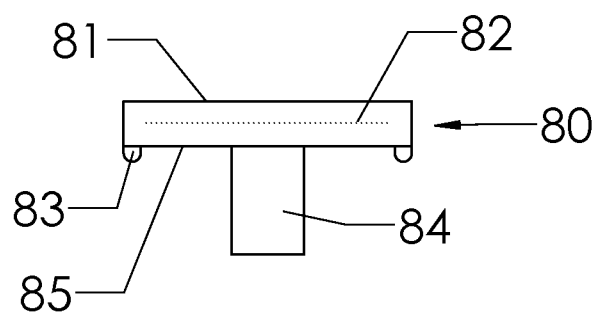
Figure 11C:
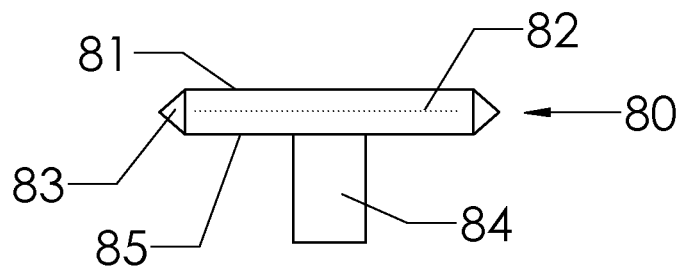
Figure 11D:
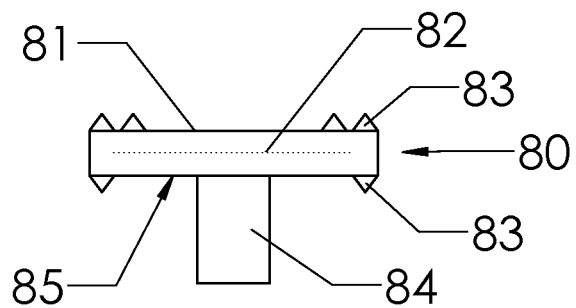

FIGS. 11A-11J, side elevational views, illustrate the various ways that top elements 81 of anchors 80 are manufactured to provide increased friction, resistance, support, and material between the top and bottom surfaces of each anchor device to assure that the anchors remain firmly in place. Known anchors have been observed to move under stress, which can cause the spacing between the boards to change, presenting an unattractive positioning of the boards, for example. The inventive concept, as taught herein, provides top element surfaces with increased friction and grabbing power by adding protuberances to either the top or the bottom surface or both (FIGS. 11A, 11B, and 11D, respectively). The protuberances may take different forms, they can be shaped to have a "pointed tip" (FIGS. 11A and 11D) or to have a more rounded shape (FIG. 11B), for example. It is to be understood that the protuberances may be found on any of surfaces of the top element, which include the top and bottom (FIG. 11D) and side surfaces (FIG. 11C). Where the protuberances are to be located is decided by the requirements of each job. Because the protuberances are made of resilient plastic, they will not cut into, or in any other way, damage the decking floor boards. There are known anchors made of metal that could have ridge lines cut into or extend from their surface, but metal ridges are extremely rigid and sharp and, thus, would damage the surface of any slot that was cut on a short tolerance. Moreover, instead of creating an increased friction surface, such hard, sharp protuberances would create weak spots in the boards by digging into them. Another advantage of having protuberances made of resilient plastic is that when pressure is applied to the edge of the deck boards, such as when they are stepped on, the protuberances supply the support that was removed when the slot was incised into the board and also help to prevent the wood above the slot from cracking. As mentioned, the slot into which an anchor is to be inserted may be as thin as or slightly thinner than the top element of the anchor. This means that known clips of metal or rigid plastic must be pounded into the slot or be discarded. However, when installers force such rigid devices into an un-accepting slot, the board material becomes stressed and can split. The only surface protuberances that can work in such instances are protuberances made of the resilient plastic as taught herein.

Figure 11E:
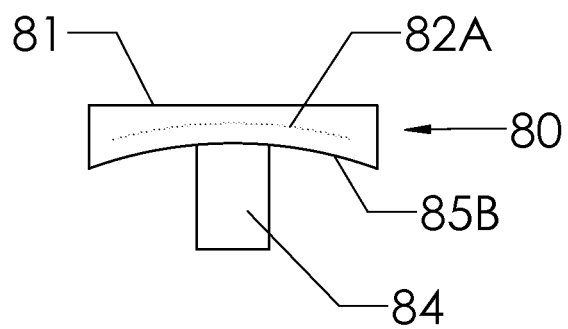
Figure 11F:
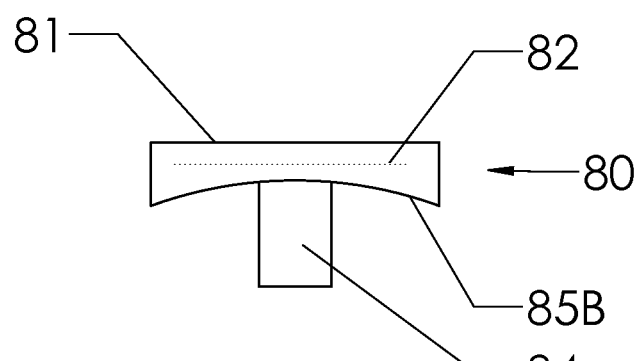
Figure 11G:
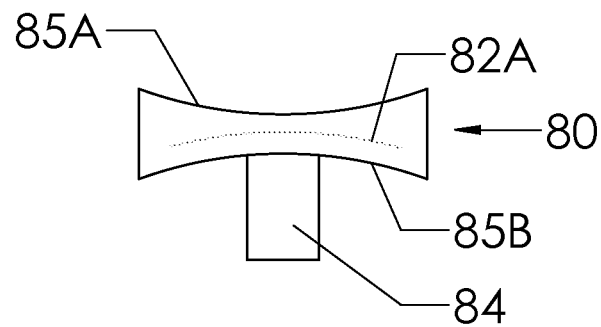
Figure 11H:
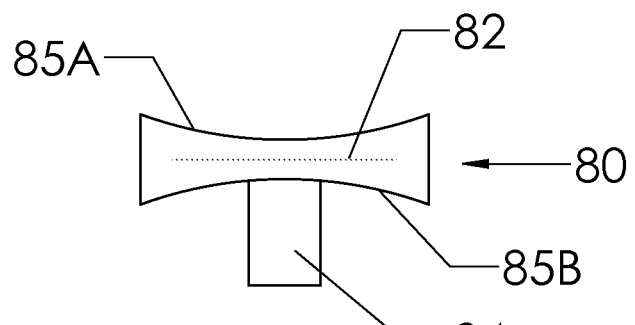
Figure 11I:
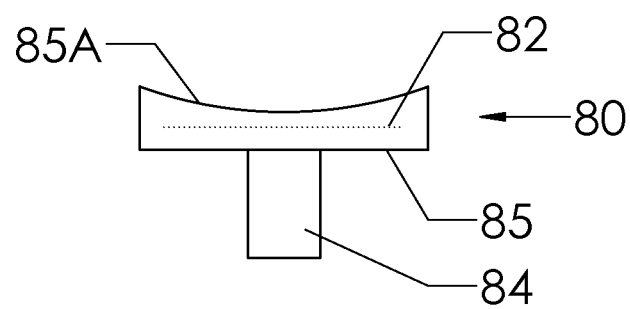
Figure 11J:
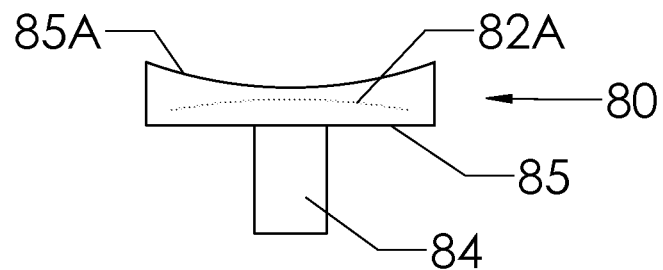

Providing for increased friction, resistance, support, and material between the top and bottom surfaces of each device is also accomplished by providing top elements with select areas that are thicker than the remaining areas of the top element by changing the shape of the surface. For example, the otherwise planar top or bottom surface can be molded to be convex or concave producing areas of greater and lesser thicknesses. FIGS. 11E and 11F illustrates an anchor 80 having top element 81 with downward extending extension 84 emanating from bottom surface 85b. Top element 81 is made thicker about the edges and thinner in the middle by have the central area of the bottom surface compressed. FIG. 11G illustrates anchor 80 having top element 81 thicker about the edges and thinner in the middle by have the central area of the top 85A and bottom 85b surfaces compressed into the element. This anchor has exceptional strength as embedded high-strength material 82A mimics the shape of the compressed bottom surface. FIG. 11H illustrates an anchor 80 having top element 81 thicker about the edges and thinner in the middle by have the central area of the top 85A and bottom 85b surfaces compressed but with embedded high-strength material 82 planar. FIG. 11I illustrates an anchor 80 having top element 81 made thicker about the edges and thinner in the middle by have the central area of top surface 85A compressed with embedded high-strength material 82 maintaining its planarity. FIG. 11J illustrates an anchor 80 having top element 81 thicker about the edges and thinner in the middle by have the central area of the top surface 85A and bottom surface 85b compressed towards each other with embedded high-strength material 82A mimicking the shape of a compressed bottom surface. Anchors made of a resilient plastic with areas of greater and lesser thicknesses makes this construction work in many instances where more rigid (rigid plastic or metal) anchors are prone to failure. For example, when the deck board material contracts, the slot spaces can increase and the resilient areas of greater thickness of the anchors expand to fill the increased space and add support as well as maintaining high-friction surfaces. Alternatively, when the slots are grooved into "wet" boards, the slots often shrink during the time it takes for the boards to be milled, stored, and delivered to a jobsite, thus requiring anchors that are resilient enough to compress to provide for insertion into the decreased sized slot. The areas of greater and lesser thicknesses made according to the principles of the invention will compress to fit into such narrow slots. One embodiment has a slight raised ridge along the outer side of the top element (FIG. 2) to concentrate the hold-down force as deep in the slot as possible to help keep the boards from cupping. No slot is machined perfectly flat as seen in drawings, so the raised edge makes sure the hold down force is as deep in the groove as possible. When the board slots are larger than intended, the areas of greater thickness of the anchors of the present invention will remain in contact with the surfaces of the slot to create a resistance between the board and the anchor to keep both the board and the anchor in place and will do this without damaging the boards. When the board slots are smaller than intended, the resilient plastic anchors can be pushed into the slot without any fear of the anchors cutting into, or in any other way, damaging the deck board.

Figure 12A:
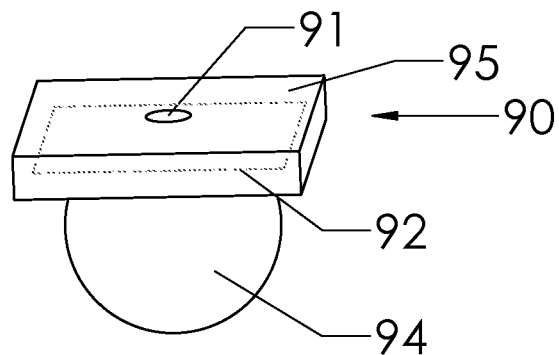
FIG. 12A is a perspective view of a further anchoring device of the invention.
Figure 12B:
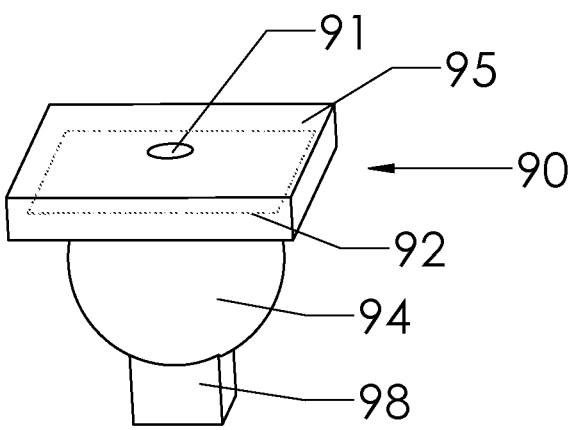
FIG. 12B is a perspective view of another further anchoring device of the invention.

FIG. 12A illustrates a perspective view of an embodiment of the anchoring device following the inventive concept taught herein with anchor 90 having generally rectilinear top element 95 and embedded high-strength material being indicated by the dotted line 92. Fastening opening 91 is arranged about center of the top element with spherical downward extending element 94 extending downwardly from the underside of top element 93. Although not shown, spherical downward extending element 94 may or may not be impregnated with a high-strength material in either a solid or a particulate form. The width made possible by the spherical shape and the strength of element 94 enables element 94 to contribute to the anchor's ability to maintain the boards in the desired spaced position. When the diameter of the spheroidal element would be too large for the desired spacing between the boards, but reducing the diameter of the spheroidal element would decrease its height which would reduce the height of the top element that is supported by the spheroidal element, the spheroidal element is supported by support base 98 to increase the height of the top element as illustrated in FIG. 12A.

Figure 13:
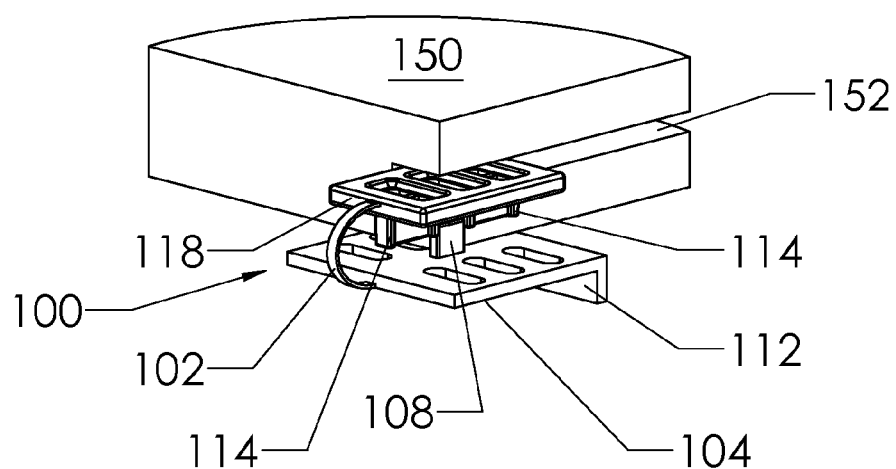
FIG. 13 is a perspective view of yet another further anchoring device of the invention in use.
Figure 13:
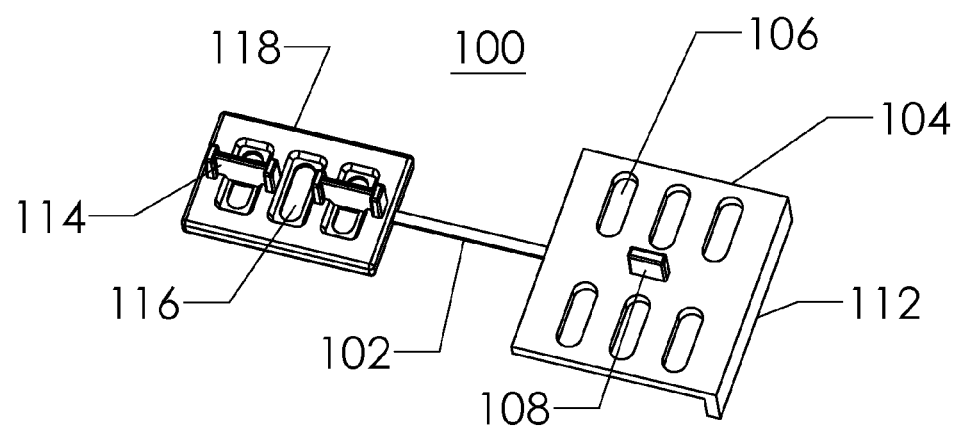
Figure 13B:
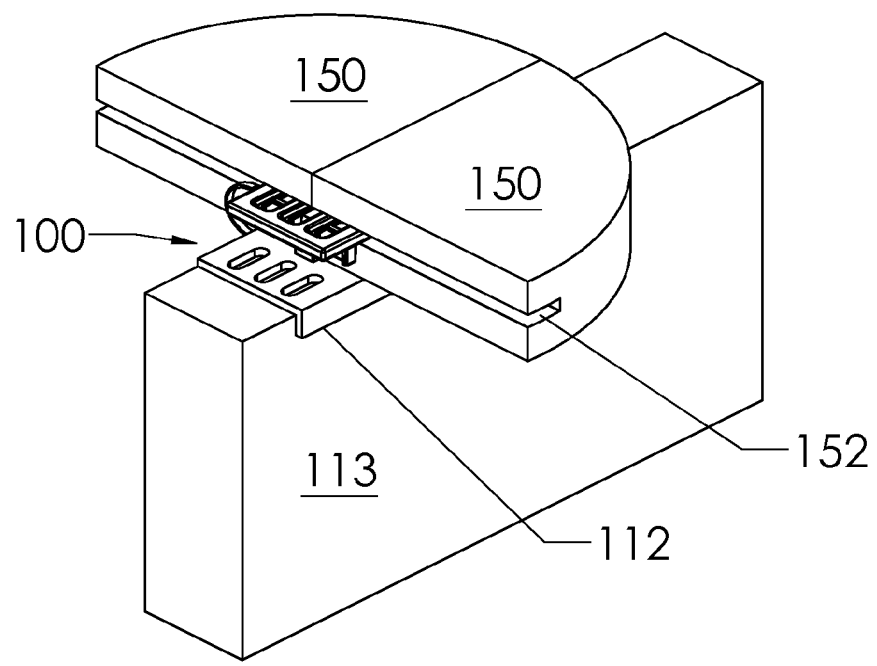
FIG. 13B is a perspective view of the anchoring device, as shown in FIG. 13A, in use connecting two planks to each other and to a joist.
Figure 13C:
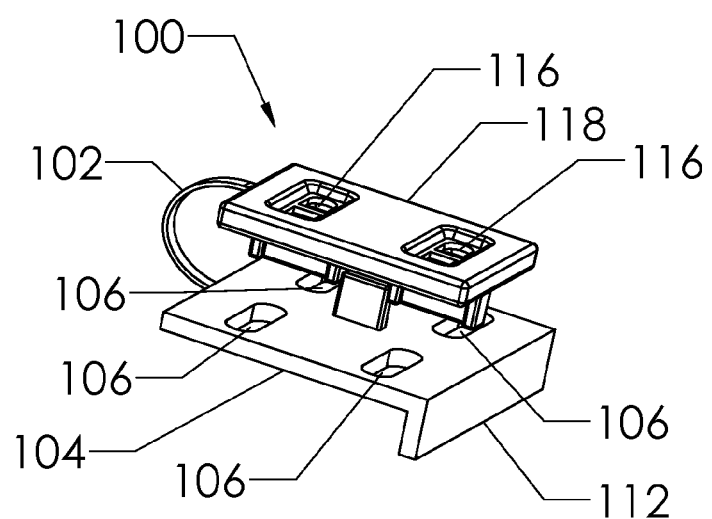
FIG. 13C is a perspective view of the anchoring device having a different number of attachment apertures and openings for drainage and screw clearance.
Figure 13D:
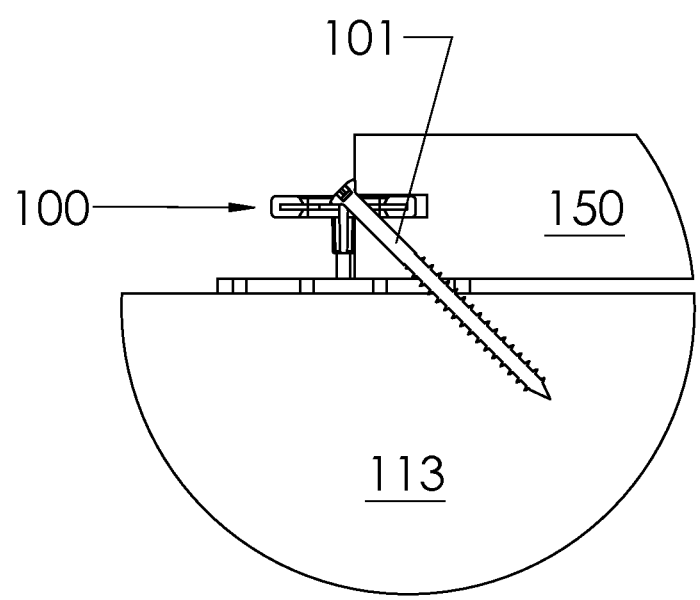
FIG. 13D is a cross-sectional view of the anchoring device being used in conjunction with a screw to attach a plank to a joist.

FIG. 13 illustrates anchor 100 inserted into slot 152 of plank 150. Anchor 100 is also referred to as a fastener and a deck-clip. Anchor 100, made according to the invention principles taught herein, consists of two connected elements, element 118 that is referred to here as a top element serves as an edge-mount fastener and thus is also referred to as an edge-mount fastener, and element 104 that is referred to here as the bottom element serves as a deck-board/joist separator and, thus, is also referred to as a deck-board/joist separator. Groove height tolerance compensator strap 102 connects edge-mount fastener 118 (top element) with deck-board joist separator 104 (bottom element). Groove height tolerance compensator strap 102 is cost-efficient as it is molded flat in the mold. The configuration of the strap provides for it to be used over a range of spaces between top element 118 and bottom element 104. Groove height tolerance compensator strap 102 also prevents the separation of top element 118 and bottom element 104 assuring that during the installation of top element 118, bottom element 104 is not dropped or misplaced. FIG. 13A illustrates deck clip 100 as it appears before groove height tolerance compensator strap 102 is adjusted so that top element 118 sits directly over bottom element 104. Both top element 118 and bottom element 104 have a plurality of attachment apertures therethrough. It should be understood that the top and bottom elements are also provided with a single attachment aperture. Top element 118 has embedded therein a high-strength core material unit (see FIGS. 14-19) and is also available having a plurality of high-strength core materials embedded therein. High-strength core material units are hard, but not brittle, and have a high tensile strength. It is, however, to be understood that top element 118 functions with or without the having high-strength core material embedded within. The addition of a high-strength material gives the element a strength that is not available in any other such known anchor elements. Top element 118 has apertures 116 therethrough and bottom element 104 has apertures 106 therethrough. When anchor 100 is positioned for use, as illustrated in FIG. 13 and FIG. 13B, apertures 116 are aligned with apertures 106, which can be best appreciated by viewing, FIG. 13C. The alignment of apertures 116 and apertures 106 provides for a fastener means, such as a screw, that is positioned through either end of an aperture 116 to be accepted in one of the apertures 106. FIG. 13D, a cross-section view, illustrates how screw 101 is positioned first through one of apertures 116 and then through one of apertures 106 before being screwed plank 150 and finally into joist 113 to secure the plank to the joist. FIG. 13 illustrates the edge of one side of one end of top plate 118, which is also referred to as edge-mount fastener 118, inserted into slot 152 of plank 150. Extending downwardly from the bottom side of edge-mount fastener 118 are two tabs 114 that serve as spacers for keeping laid planks at desired distances from each other. It should be understood that either a single or a multiple of tab(s) 114 may be used. Extending upwardly from the top side of bottom element 104, also referred to as deck board-joist separator, is tab 108 that serves to maintain the anchor in its correct position regardless of the non-uniformity of the precut joining slots or grooves that are formed in the sides of planks for the purpose of accepting such anchors. Thus, in addition to being both resilient and strong, anchor 100 is capable of compensating for variations in the height of joining slots, as well as maintaining a desired spacing between laid planks. Deck board-joist separator 104 additionally serves to assure a separation between the laid planks and the support on which the planks are laid. This separation provides for air circulation that helps to alleviate rot that could be caused by standing water if plank and support are too closely spaced. As illustrated on FIG. 13B, shoulder 112 serves to locate deck board-joist separator 104 in position on the joist 113. When two boards are butted together, such as is illustrated in FIG. 13B, multiple clips, at one time, were required. Anchor 100 eliminates the need for multiple clips. The multiple apertures in anchor 100 provides for both planks 150 to be fastened to support 113 using only one clip, thus saving both time and money, while providing for a more secure attachment.

Figure 14:
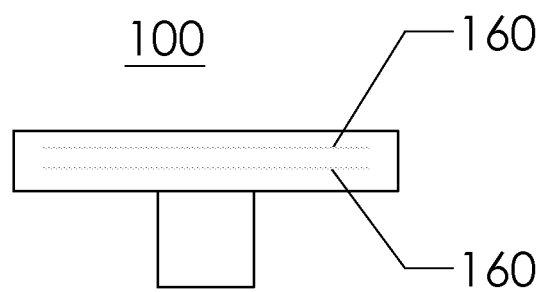
FIG. 14 is an elevation view illustrating the use of multiple units of high-strength material.

As the cost of good wood increases, cheaper lower quality wood species, which tend to cup and warp more, are being used instead. Poor quality wood boards require more hold-down strength because of their propensity to buckle. This requires stronger anchors that any cupping or warping of the board being held in place does not affect the anchor's hold on the board. FIG. 14 illustrates the use of multiple layers of high-strength material 160 embedded into anchor 100 to make the anchor stronger so that it can effectively hold-down the planks it secures to joists. In this example, two layer of high-strength material are embedded into the anchor.

Figure 15:
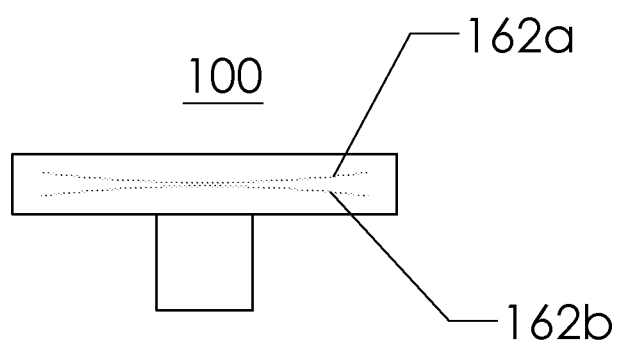
FIG. 15 is an elevation view illustrating an embedded convexly-shaped unit of a high-strength material and concavely-shaped unit of a high-strength material opposing one another in the top section of an anchoring device to add additional strength to the device.

Embedding multiple shaped layers of high-strength material 162 embedded into anchor 100 further increases the strength of the anchor. FIG. 15 illustrates adding more strength to deck clip 100 by embedding opposing concave layers of high-strength material within anchor 100, for example. It should be understood that additional configurations are also part of the inventive concept.

Figure 16:
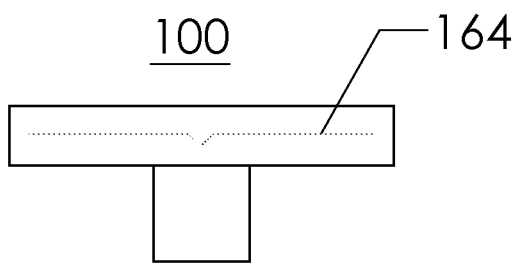
FIG. 16 is an elevation view illustrating an embedded unit of a high-strength material expansion material having an expanded extension/contraction notch.
Figure 17:
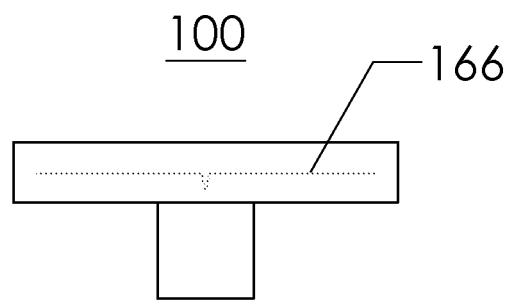
FIG. 17 is an elevation view illustrating an embedded unit of a high-strength material having a compressed extension/contraction notch.

Planks of all kinds, especially wood, expand and contract due a variety of reasons, such as temperature fluctuations including freeze and thaw cycles. Expansion and contraction worsens in lower quality wood. This situation requires an anchor having additional strength and one that is able to adjust to such additional forces placed on it. FIG. 16 illustrates an example of an expansion joint or notch in a layer of high-strength material 164 where a notch has expanded. An analogous situation occurs when shrinkage of planks occurs. FIG. 17 illustrates an example of an expansion joint in a layer of high-strength material 166 embedded within anchor 100 where the joint has been compressed due to the compression force acting on the plank that is secured by anchor 100.

Figure 18A:
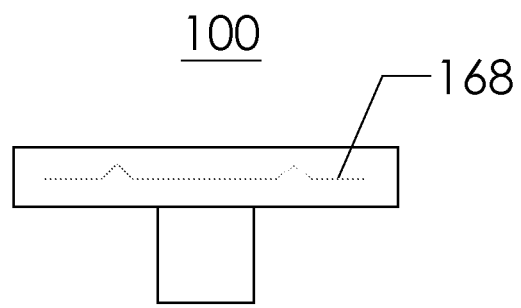
FIG. 18A is an elevation view illustrating an embedded unit of a high-strength material having multiple extension/contraction notches.
Figure 18B:
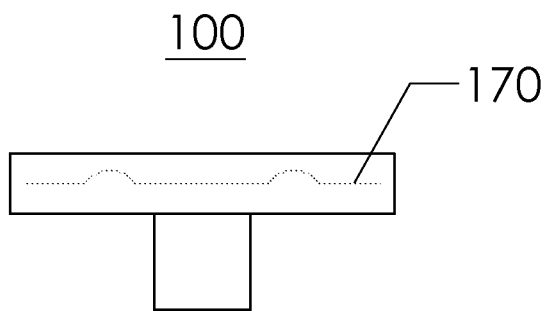
FIG. 18B is an elevation view illustrating an embedded unit of a high-strength material having a differently shaped set of multiple extension/contraction reverse notches.

FIG. 18A illustrates an example of multiple strengthening-bends in a layer of high-strength material 168 embedded within anchor 100 to provide even greater hold down strength to the anchor. FIG. 18B illustrates a shaped variation of notches or bends that are added to layer of high-strength material 170 embedded within anchor 100 to provide greater strength to the clip anchor.

Figure 19:
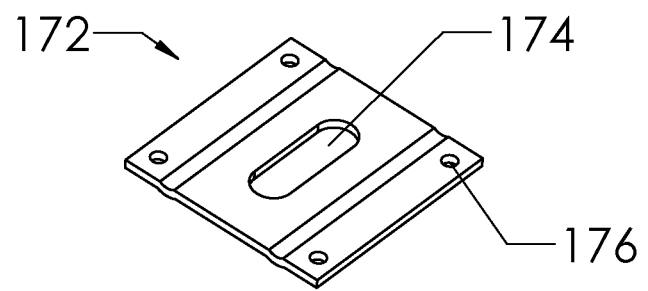
FIG. 19 is a perspective view of unit of a high-strength material illustrating a set of four holes added to the unit to provide for more uniform plastic flow creating a greater bond of the plastic to the high-strength material and a set of differently styled notches adding additional strength to high-strength material.

FIG. 19 provides an example of a layer of high-strength material 172 before it is embedded within anchor 100. In addition to aperture 174 shaped and positioned to receive a screw, or the like, for attachment of a plank to a joist, this example also shows another example of having an strengthening-bends or notch on each side of aperture 174, as discussed above, along with apertures 176 roughly positioned in each of the four corners added to high-strength material 172 providing for the resilient plastic in its melted form to flow through holes to create a greater bond of the plastic to the metal increasing the structural integrity of the thus-formed anchor.

Thus, it has been shown that Applicant devised a set of inventive principles that provide for an anchor that offers both a high degree of resiliency and the strength required for a deck anchor that is made possible by embedding and securing a high-strength material within the anchor body of flexible, resilient material; a high-friction non-slip surface, the ability to accommodate the irregular shape and size of the pre-cut slots into which the anchors are fit, the ability to accommodate buckling, extension, and compression of the planks that are secured by the anchor. Moreover, the inventive concept provides for a single anchor can be used to secure two adjacent planks using only one anchor providing an even more secure attachment of the planks to their support. Furthermore, the inventive principles include the ability of the anchor to keep the planks separated from the joists so that any water between the two has an opportunity to evaporate and not cause rot. The high-strength material is embedded into the anchor during the molding process that is used to manufacture the anchor. Small openings within a layer of high-strength material provide for the molten plastic of the molding process to reach all surfaces of the high-strength material creating a strong bond between plastic and high-strength material. Additionally, the flexible resilient part of Applicant's anchor also provides for absorption of stresses induced by repeated seasonal or diurnal expansion and contraction of the decking boards and/or worker or user induced stresses. While the flexible body of Applicant's fastener absorbs the stresses, the high-strength insert limits the deleterious effects of the deck board on the anchor preventing crushing or damaging of the anchor during and after installation. Therefore, Applicant's anchor more consistently and for a longer time maintains a desired gap space between fastened deck boards both during and after installation.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. An anchoring device comprising:
    an anchor that anchors adjacent planks to each other and to a support, comprising:
        a generally horizontal top element having areas varying thicknesses;
        a generally horizontal bottom element,
    said bottom element to maintain a separation between the planks and the support, and
        a groove height tolerance compensator strap connecting said top element to said bottom element,
    said top element, said bottom element, and said groove height tolerance compensator strap made of a resilient material,
    said top element sized for insertion into a joining slot of a laid plank, and
    said top element and said bottom element having one or more fastening apertures therethrough, and
    said top element having a core component of one or more units of non-resilient, hard but not brittle material.

2. The anchoring device, as recited by claim 1, said top element further comprising one or more spacers tabs extending downwardly from the bottom side of said top element for keeping laid planks at desired distances from each other.

3. The anchoring device of claim 1, said bottom element further comprising a tab extending upwardly from a top side of said bottom element to maintain the anchoring device in a correct position regardless of how non-uniform joining slots are precut in sides of planks.

4. The anchoring device, as recited by claim 1, wherein said areas of varying thicknesses of said top element comprise protuberances extending from a top, bottom, side surface of said top element or a combination thereof, where said protuberance height is determined by the height of the joining slot and the resiliency of the protuberance.

5. The anchoring device, as recited by claim 1, wherein said fastening apertures comprises a plurality of fastening apertures and said top element fastening apertures and said bottom element fastening apertures positioned for complementary alignment with each other when said anchor is in use.

6. The anchoring device, as recited by claim 1, wherein said core component is a solid.

7. The anchoring device, as recited by claim 1, wherein said core component is a metal.

8. The anchoring device, as recited by claim 1, wherein said core component is a plastic.

9. The anchoring device, as recited by claim 1, wherein said core component is a fiberglass.

10. The anchoring device, as recited by claim 1, wherein said core component is in particulate form.

11. The anchoring device, as recited by claim 1, wherein said top element fastening apertures and said bottom element fastening apertures of anchor are positioned for fastening one to four planks to a support using only a single anchor.

12. The anchoring device, as recited by claim 1, wherein said bottom element further comprises a shoulder to locate the bottom element in position on the support.

13. The anchoring device, as recited by claim 1, wherein said core component is embedded within said resilient material via a molding process.

14. The anchoring device, as recited by claim 6, wherein said solid core component has a set of apertures therethrough for a resilient plastic in a melted form to flow through creating a strong bond of the resilient plastic to a metal.

15. The anchoring device, as recited by claim 1, wherein said core component is a plurality of core components.

16. The anchoring device, as recited by claim 1, having one or more core components with at least one core component shaped to have a convex or concave profile.

17. The anchoring device, as recited by claim 1, having one or more core components with at least one core component having expansion joints therein.

18. An anchoring device comprising:
an anchor that anchors adjacent planks to each other and to a support, comprising:
   a generally horizontal top element of varying thicknesses;
   a generally horizontal bottom element,
said bottom element maintain a separation between the planks and the support, and
   a groove height tolerance compensator strap connecting said top element to said bottom element,
said top element, said bottom element, and said groove height tolerance compensator strap made of a resilient material,
said top element having at least one core component of a non-resilient, hard but not brittle material,
   said core component having a fastening aperture therethrough and one or more expansion joints therein,
   said top element sized for insertion into a joining slot of a laid plank, and
   said top element and said bottom element having one or more fastening apertures therethrough.

19. An anchoring device comprising:
an anchor that anchors adjacent planks to each other and to a support, comprising:
   a generally horizontal top element of varying thicknesses;
   a generally horizontal bottom element,
said bottom element maintain a separation between the planks and the support, and
   a groove height tolerance compensator strap connecting said top element to said bottom element,
said top element, said bottom element, and said groove height tolerance compensator strap made of a resilient material,
said top element having at least one core component of a non-resilient, hard but not brittle material,
   said core component being a metal plate,
   said metal plate having a fastening aperture therethrough and one or more expansion joints therein,
   said top element sized for insertion into a joining slot of a laid plank, and
   said top element and said bottom element having one or more fastening apertures therethrough.

* * * * *